United States Patent [19]
Pars et al.

[11] 3,728,360
[45] Apr. 17, 1973

[54] ESTER DERIVATIVES OF TETRAHYDROCANNABINOL

[75] Inventors: Harry G. Pars, Lexington; Raj K. Razdan, Belmont; Klaus K. Weinhardt, Brighton, all of Mass.

[73] Assignee: Arthur D. Little, Inc., Cambridge, Mass.

[22] Filed: Aug. 31, 1971

[21] Appl. No.: 176,720

Related U.S. Application Data

[63] Continuation-in-part of Ser. No. 11,297, Feb. 13, 1970, abandoned.

[52] U.S. Cl.................................260/345.3, 424/283
[51] Int. Cl................................................C07d 7/18
[58] Field of Search....................................260/345.3

[56] References Cited

UNITED STATES PATENTS 3,507,885    4/1970    Fahrenholtz.......................260/345.3

FOREIGN PATENTS OR APPLICATIONS 554,832    7/1943    Great Britain.....................260/345.3
268,988    10/1950    Switzerland......................260/345.3

Primary Examiner—John M. Ford
Attorney—Bessie A. Lepper

[57] ABSTRACT

Novel 1-[ω-(dilower-alkylamino)acyloxy]-3-alkyl(and cycloalkyl-lower-alkyl) 6a, 7,8,10a-(and 6a,7,10,10a- and 7,8,9,10-)tetrahydro-6,6,9-trilower-alkyl-6H-dibenzo[b,d]pyrans and acid salts thereof. These compounds possess biological acitivity and are useful as therapeutic agents.

18 Claims, No Drawings

ESTER DERIVATIVES OF TETRAHYDROCANNABINOL

This application is a continuation-in-part of our application Ser. No. 11,297 filed Feb. 13, 1970, now abandoned.

This invention relates to novel ester derivatives of $\Delta^{6a}$, $\Delta^8$ $\Delta^9$ tetrahydrocannabinols and the preparation of the same.

The invention sought to be patented, in its composition aspects, resides in the concept of a class of chemical compounds which is designated as 1-[ω- (dilower-alkylamino)acyloxy]-3-alkyl (and cycloalkyl-lower-alkyl) 6a, 7,8,10a-(and 6a,7,10,10a- and 7,8, 9,10-) tetrahydro-6,6,9-trilower-alkyl-6H-dibenzo [b,d]pyrans and acid and quaternary salts thereof some of the acid salts of which are water soluble. The tangible embodiments of this composition aspect of the invention possess the inherent use characteristics of having biological activity as determined by standard pharmacological test procedures for potential therapeutic drugs. The compounds of this invention are amino esters, and some of their acid addition salts are water soluble. These esters offer the possibility of being hydrolyzed in vivo to form the corresponding phenolic compound. The rate of such hydrolysis may be regulated by the nature of the ester chain.

It is therefore a primary object of this invention to provide novel chemical compositions of matter and a method of forming them. It is another object to provide chemical compositions which exhibit CNS properties and which offer the possibility of hydrolysis in vivo. Ohter objects of the invention will in part be obvious and will in part be apparent hereinafter.

The invention accordingly comprises the several steps and the relation of one or more of such steps with respect to each of the others, and the composition of matter possessing the characterstics, properties and relation of components which will be exemplified in the compositions hereinafter described, and the scope of the invention will be indicated in the claims.

Without limiting the generality of the foregoing, illustrative and preferred embodiments of our 1-[ω-(dilower-alkylamino) acyloxy] -3-alkyl (and cycloalkyl-lower-alkyl) 6a,7,8,10a- (and 6a,7,10,10a- and 7,8,9,10-) tetrahydro-6,6,9-trilower-alkyl- 6H-dibenzo[ b,d]pyrans are those of the formula I

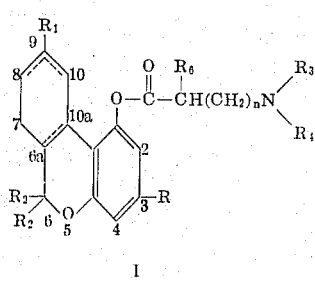

I wherein n 13 a whole number ranging from 0 to 6, $R_1$, $R_2$, $R_3$ and $R_4$ are lower alkyl, $R_5$ is alkyl or cycloalkyl-lower-alkyl and $R_6$ is hydrogen or lower-alkyl.

The compounds of the class of formula I may be either the $\Delta^{6a}$, $\Delta^8$ or $\Delta^9$ structure. Those of the $\Delta^{6a}$ structure, or the 1 -[ω-(dilower-alkylamino)acyloxy]-3-alkyl(and cycloalkyl-lower-alkyl)-7,8,9,10-tetrahydro-6,6,9-trilower-alkyl-6H-dibenzo[b,d] pyrans, have the formula II

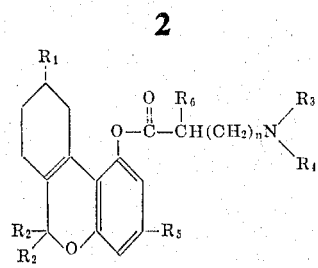

II

Those compounds of the $\Delta^8$ structure, or the 1-[ω-(di-lower-alkylamino)acyloxy]-3-alkyl(and cycloalkyl-lower-alkyl)-6a, 7,10,10a-tetrahydro-6,6,9-trilower-alkyl-6H-dibenzo[b,d]pyrans, have the formula III

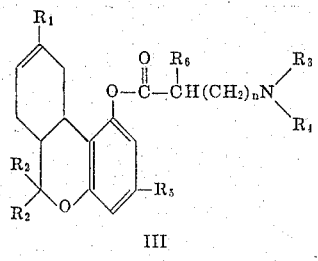

III

Those compounds of the $\Delta^9$ structure, or the 1-[ω-(di-lower-alkylamino)acyloxy]-3-alkyl (and cycloalkyl-lower-alkyl)-6a, 7,8,10a-tetrahydro-6,6,9-trilower-alkyl-6H-dibenzo[b,d] pyrans, have the formula IV

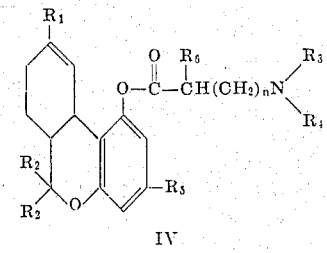

IV

The preferred embodiments of the acid addition salts of our 1-[ω-(dilower-alkyl-amino)acyloxy]- 3-alkyl(and cycloalkyl-lower-alkyl)6a,7,8,10a- (and 6a,7,10,10a- and 7,8,9,10-) tetrahydro-6,6,9-trilower-alkyl-6H-dibenzo[b,d]pyrans are those of the formula V

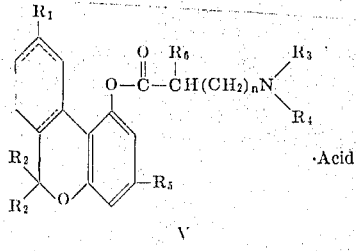

V

These acid addition salts of formula V may be either the $\Delta^{6a}$, $\Delta^8$ or $\Delta^9$ structure as in the free base forms of formulas II, III and IV.

In formulas II–V n and $R_1$–$R_6$ have the same meanings as in formula I.

As used herein, the term "lower-alkyl" means saturated, monovalent aliphatic-radicals including straight and branched-chain radicals of from one to six carbon atoms, as illustrated by, but not limited to methyl, ehtyl, propyl, isopropyl, butyl, sec. -butyl, amyl, hexyl, and the like.

As used herein, the term "alkyl" means saturated monovalent aliphatic-radicals, including striaght and branched-chain radicals of from 1 to 20 carbon atoms, as illustrated by, but not limited to methyl, n-amyl, n-hexyl, 2-heptyl, n-heptyl, 3-methyl-2-octyl, n-octyl, 2-nonyl, 2-tetradecyl, n-hexadecyl, 2-eicosanyl, and the like.

As used herein, the term "cycloalkyl" means cyclic saturated aliphatic-radicals of from three to eight carbon atoms, as illustrated by, but not limited to cyclopropyl, cyclobutyl, 2-methylcyclobutyl, cyclohexyl, 4-methylcyclohexyl, cyclooctyl, and the like.

The invention in one of its process aspect is described in residing in the process of reacting a compound of formula VI

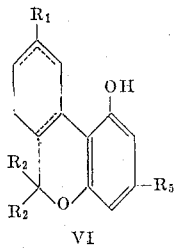

VI wherein $R_1$, $R_2$ and $R_5$ have the meanings defined previously, with a ω-dilower-akylamino aliphatic acid of the formula VII

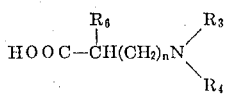

wherein n is a whole number ranging from 0 to 6 and $R_3$ and $R_4$ are lower alkyl and $R_6$ is hydrogen or lower-alkyl. The reaction is carried out in a solvent for the cannabinol which is essentially inert under the conditions of the reaction; for example, methylene chloride, methanol, ethanol, dimethylformamide, or water, and in the presence of a condensing agent. The reaction may be represented as

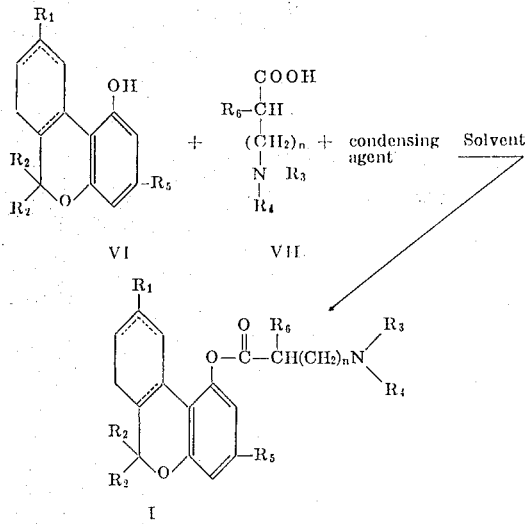

The invention in another of its process aspects is described as residing in the process of reacting the acid addition salts VIIa of the compound of formula VII with the compound of formula VI to form directly the acid addition salt of the compound of formula V. This reaction may be represented as

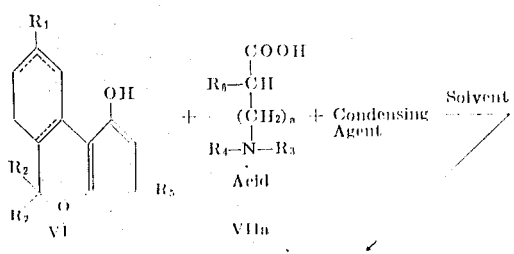

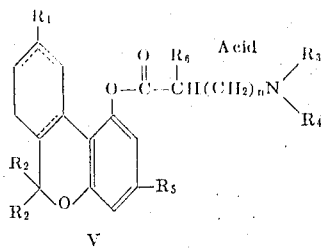

This reaction is carried out in the same manner as that one by which the free base is formed.

The compounds of formula VI may be prepared by the procedure disclosed by T. Petrzilka, W. Haefliger and C. Sikemeier in *Helvetica Chimica Acta*, 52: 1102 (1969).

The condensing agent used in the formation of the compounds of formulas I through V include the carbodiimides (water soluble and water insoluble) and related compounds which are capable of achieving the necessary dehydrative coupling of the hydroxy group of the tetrahydrocannabinol to the amino acid. The carbodiimides suitable as condensing agents are described in the literature. (See for example *Journal of Organic Chemistry* 21: 439 (1956) and 26: 2525 (1961); *Bulletin de la Societe Chimique de France* (1956) p. 1360; and U.S. Pat. No. 3,135,748). The functional group of these carbodiimides is —N=C=N— and a number of them, including their acid addition products, are soluble in water. Among the other condensing agents which may be used are diethylcyanamide (($C_2H_5)_2$ NCN), cyanamide ($H_2NC_N$, which in its tautomeric form is a carbodiimide) and N-ethyl-5-phenylisoxazolium-3-sulfonate. These condensing agents may be employed in aqueous solutions. Finally, other condensing agents which function in nonaqueous media are exemplified by N,N'-carbonyl diimidazole, and ethoxyacetylene which are dehydrative linking agents and bis-(2,4-dinitrophenyl) carbamate and 2-ethoxypyridine-1-oxide which link through active ester formation.

As noted, the acid addition salts may be formed directly without the need for formation of the free base first. However, the free base form of formula I may be readily converted to the acid addition salt form by interaction of the base with an acid. In like manner, the free bases can be regenerated from the acid-addition salt form in the conventional manner, that is by treating the salts with strong aqueous bases, for example alkali metal hydroxides, alkali metal carbonates, and alkali metal bicarbonates. The bases thus regenerated can then be interacted with the same or a different acid to give back the same or different acid-addition salt. Thus the novel bases and all of their acid-addition salts are readily interconvertible.

Due to the presence of a basic tertiary amino grouping, the compounds of this invention also form quaternary ammonium salts.

The quaternary ammonium salts of the compounds of formulas I–IV are obtained by the addition of esters of strong acids to the free base form of the compounds, said esters having a molecular weight less than about 300. A preferred class of esters comprises alkyl, alkenyl, and phenyl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzensulfonate, methyl p-toluenesulfonate, benzyl chloride, benzyl bromide, and substituted benzyl halides, for example p-chlorobenzyl chloride, 3,4-dichlorobenzyl chloride, pentachlorobenzyl chloride, p-nitrobenzyl chloride, p-methoxybenzyl chloride, and the like.

We have found that by virtue of the common structural entity among the bases and their acid-addition salts as well as the quaternary ammonium salts, these compounds have inherent pharmacodynamic activity of a type to be more fully described hereinbelow. This inherent pharmacodynamic activity can be enjoyed in useful form for pharmaceutical purposes by employing the free bases themselves or the acid-addition or quaternary ammonium salts formed from pharmaceutically-acceptable acids or esters of strong acids, that is, acids or esters whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the acid-addition salt with aqueous base as explained above, or alternatively, the acid-addition salt can be converted to any desired pharmaceutically-acceptable acid-addition salt by double decomposition reactions involving the anion, for example, by ion-exchange procedures.

As in the case of the acid-addition salts, water-insolubility, high toxicity, or lack of crystalline character may make some quaternary ammonium salt species unsuitable or less desirable for use as such in a given pharmaceutical application. The water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Moreover, apart from their usefulness in pharmaceutical applications, our salts are useful as characterizing or identifying derivatives of the free bases or in isolation or purification procedures. Such characterizing or purification acid-addition salt derivatives, like all of the acid-addition salts, can, if desired, be used to regenerate the pharmaceutically-acceptable free bases by reaction of the salts with aqueous base, or alternatively the acid-addition or quaternary ammonium salt can be converted to a pharmaceutically-acceptable salt by, for example, ion-exchange procedures.

It will be appreciated from the foregoing that all of the acid-addition and quaternary ammonium salts of our new bases are useful and valuable compounds regardless of considerations of solubility, toxicity, physical form, and the like, and accordingly are within the purview of the instant invention.

The novel features of the compounds of the invention, then, resides in the concept of the bases and the cationic forms of the new compounds of formulas I–V and not in any particular acid or ester moiety or anion associated with the salt forms of the compounds; rather, the acid or ester moieties or anions which can be associated in the salt forms are in themselves neither novel nor critical and therefore can be any anion or acid-like substance capable of salt formation with bases. In fact, in aqueous solutions, the base form or water-soluble acid-addition salt form of the compounds of the invention both possess a common protonated cation or ammonium ion.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfonic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts may be prepared directly, by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and an ester of a strong acid in an inert solvent. Heating may be used to facilitate the reaction, although salt formation usually takes place readily at room temperature. The quaternary ammonium salt separates directly or can be obtained by concentration of the solution.

The compounds of formulas I–V have been shown to possess central nervous system activity as evidenced by gross overt changes induced by administration in mice in standard tests involving observations of psychomotor activity, reactivity to stimuli, and ability to perform normal, non-conditioned motor tasks (See Irwin, *Animal and Clinical Pharmacologic Techniques in Drug Evaluation*, Year Book Medical Publishers, Inc., Chicago, Illinois, pp. 36-54 (1964). Exemplary of this activity is the fact that the compounds are depressants of spontaneous motor activity at doses of the order of 10-20 mg/kg when administered parenterally or orally. As an example of reactivity to stimuli, an $ED_{50}$ value of about 45 mg/kg was determined in the Eddy hot plate test when administered parenterally. (For a complete description of the test used see N.B. Eddy and D. Leimbach, *Journal of Pharmacology and Experimental Therapeutics*, 160:217 (1968)). These activities indicate the compounds' usefulness as psychotherapeutic agents.

The compounds can be prepared for use by dissolving under sterile conditions a salt form of the compounds in water (or an equivalent amount of a nontoxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The molecular structures of the compounds of our invention were assigned on the basis of study of their infrared, ultraviolet and NMR spectra and their transformation products, and confirmed by the correspondence of calculated and found values for the elementary analyses for representative examples.

The following examples will further illustrate the invention without, however, limiting it thereto.

EXAMPLE 1

1-[4-(Diethylamino)butyryloxy]-3-pentyl-6a,7,8,10a-tetrahydro-6,6,9-trimethyl-6H-dibenzo[b,d]pyran Hydrochloride A solution of 2.1 grams (ca. 6.7 mmole) of $\Delta^9$ tetrahydrocannabinol (1-hydroxy-3-pentyl-6l,7,8,10a-tetrahydro-6,6,9-trimethyl-6H-dibenzo[b,d]pyran) prepared according to Petrzilka, Haefliger and Sikemeier, *Helvetica Chimica Acta*, 52: 1102 (1969), 1.45 grams (7.05 mmole) of dicyclohexylcarbodiimode (condensing agent) and 1.35 grams (6.9 mmole) of 4-diethylaminobutyric acid hydrochloride (prepared according to the method of F. F. Blicke, W.B. Wright, Jr., and M. F. Zienty, *Journal of the American Chemical Society* 63: 2488-2490 (1941) in 125 ml of methylene chloride was stirred for about 15 hours at room temperature. Some by-product dicyclohexylurea formed from the condensing agent precipitated and was removed by filtration.

The solvent was removed from the reaction mixture and the residue (3.7 grams) was treated with about 30 ml of water and filtered. The filtrate was frozen and the water was removed by lyophilization. The glassy residue (2.3 grams) was treated with 50 ml of ether and the resulting white solid was collected and dried in vacuo, 1.5 grams, mp 116°-121°. This solid was issolved in about 15 ml of benzene, treated with decolorizing charcoal and was filtered. The filtrate was warmed (40°-45°) and treated with about 40 ml of ether. Crystallization of fine white needles, 0.88 g (27 percent yield), mp 127.5°-129°C. A small amount was recrystallized again (benzene-ether), mp 128.5°-130 °C.

Anal. Calcd for $C_{29}H_{45}NO_3 \cdot HCl$, (MW 492.12) : C, 70.77; H, 9.42; N, 2.84; Cl, 7.20. Found: C, 70.21; H, 9.26; N, 2.76; Cl, 7.15. $[\alpha]_D^{26} = -143°$ ($c = 0.61$, $CHCl_3$). Infrared and nmr spectra were recorded and are in agreement with the structure

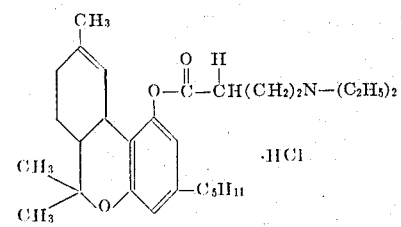

EXAMPLE 2

1-[4-(Diethylamino)butyryloxy]-3-pentyl-6a, 7,8,10a-tetrahydro-6,6,9-trimethyl-6H-dibenzo[b,d]pyran The procedure of Example 1 was repeated, except that 4-diethylaminobutyric acid was used in place of the 4-diethylaminobutyric acid hydrochloride. The resulting purified free amino ester of the formula

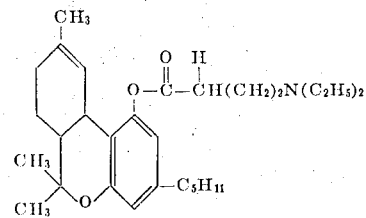

was identified by *nmr*. It was converted into the corresponding hydrochloride salt of Example 1 by treatment with ethanolic hydrogen chloride, recrystallized (benzene-Ether), mp 128.5°- 130°C.

EXAMPLE 3

1-[4-(Diethylamino)butyryloxy]-3-[3-methyl-2-octyl]-6a,7,8,10a-tetrahydro-6,6,9-trimethyl-6H-dibenzo[b,d]pyran Hydrochloride A solution of 1.53 grams (4.13 mmoles) of 1-hydroxy-3- (3-methyl-2-octyl)-6a,7,8,10a-tetrahydro-6,6,9-trimethyl-6H-dibenzo[b,d]pyran, 0.875 gram (4.25 mmoles) of dicyclohexlcarbodimide (condensing agent) and 0.820 gram (4.19 mmoles) of 4-diethylaminobutric acid hydrochloride (prepared by the acid hydrolysis of commercially available 4-(diethylamino)butyronitrile) in 70 ml of methylene chloride was stirred for about 3 days at room temperature. The dicyclohexylurea which precipitated out was filtered and discarded. The solvent was removed from the filtrate and the viscous residue was found to be a mixture of the desired ester and unreacted starting material. The mixture was redissolved in 60 ml of methylene chloride and treated again with same quantities of dicyclohexylcarbodiimide and 4-diethylaminobutyric acid. After stirring for 2 days at room temperature under nitrogen an additional quantity of dicyclohexylurea was filtered off and the filtrate was concentrated. The concentrate was diluted with 15 ml of benzene and cooled in ice for a short time. The solution was filtered again and the filtrate was evaporated to a viscous residue. The residue was dissolved in 100 ml of ether, filtered a third time to remove a small amount of insoluble material and the filtrate was evaporated to dryness. A viscous, glassy product was obtained, which was soluble in benzene, ether and water. Its tlc has no trace of the starting material and its infrared, ultraviolet, and *nmr* spectra were consistent with the assigned structure.

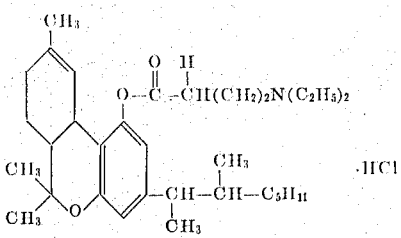

Anal. Calcd for $C_{33}H_{53}NO_3 \cdot HCl$: C, 72.29; H, 9.93; N, 2.55; Cl, 6,47. Found: C, 72.30; H, 10.14; N, 2.72; Cl, 6.65.

EXAMPLE 4

1-[4-(Diethylamino)butyryloxy]-3-[3-methyl-2-octy;]-6a,7,8,10a-tetrahydro-6,6,9-trimethyl-6H-dibenzo[b,d]pyran This is prepared by the method of Example 3, except that 4-diethylaminobutyric acid is substituted for the 4-diethylaminobutyric acid hydrochloride to give the free amino ester of the formula

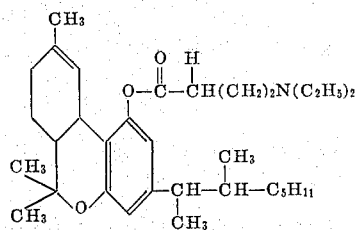

This free amino ester may be converted to the corresponding hydrochloride salt of Example 3 by treatment with ethanolic hydrogen chloride to give a product identical with that of Example 3.

EXAMPLE 5

1-[4-(Diethylamino)butyryloxy]-3-pentyl-6a,7,10,10a-tetrahydro-6,6,9-trimethyl-6H-dibenzo[b,d]pyran Hydrochloride The procedure of Example 1 was used starting with $\Delta^8$ tetrahydrocannabinol (1-hydroxy-3-pentyl-6 a,7,9,10a-tetrahydro-6, 6,9-trimethyl-6H-dibenzo[b,d]pyran) in place of the $\Delta^9$ structure used in Example 1. The work up from water was omitted. The yield of pure final product identifiable by infrared and nmr spectra as

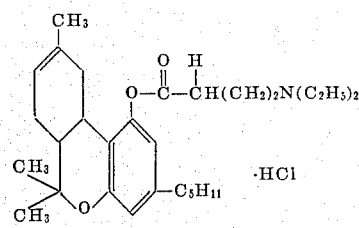

was 70 percent, mp 151°–152.5°C. Recrystallization from a cyclohexanebenzene mixture was possible.

Anal. Calcd for $C_{29}H_{45}NO_3 \cdot HCl$ (MW 492.12): C, 70.77; H, 9.42; N, 2.84; Cl, 7.20. Found: C, 70.33; H, 9.50; N, 2,73; Cl, 7.57 $[\alpha]_D^{27} = -183°$ ($c = 0.66$, $CHCl_3$).

EXAMPLE 6

1-[4-(Diethylamino)butyryloxy]-3-pentyl-6a,7,10,10a-tetrahydro-6,6,9-trimethy16H-dibenzo[b,d]pyran The procedure of Example 3 may be repeated except that 4-diethylaminobutyric acid may be used in place of the 4-diethylaminobutyric acid hydrochloride. When purified the resulting product will be the free amino ester of the formula

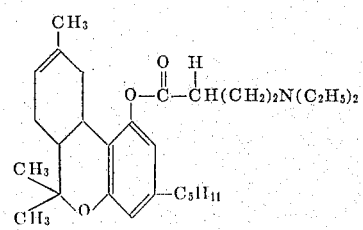

This free amino ester may then be converted to the corresponding hydrochloride salt of Example 5 by treatment with ethanolic hydrogen chloride to give a product identical with that of Example 5.

EXAMPLE 7

1-[4-(Diethylamino)butyryloxy]-3-hexyl-7,8,9,10-tetrahydro-6,6,9-trimethyl-6H-dibenzo[b,d]pyran Hydrochloride A solution of 1.76 grams (5.35 mmoles) of 3-hexyl-1- hydroxy-7,8,9,10-tetrahydro-6,6,9-trimethyl-6H-dibenzo[b,d]pyran (prepared according to R. Adams, S. Loewe, C. Jelinck and H. Wolff, J. Am. Chem. Soc., 63, 1971 (1941)), 1.25 grams (6.07 mmoles) of dicyclohexylcarbodiimide and 1.14 grams (5.82 mmoles) of 4-diethylaminobutyric acid hydrochloride in 60 ml of methylene chloride was stirred for 2.5 days at room temperature. The workup was similar to that described in Examples 1 and 3.

1.4 grams (52 percent), m.p. 77°–80°. The product was identified by infrared, ultraviolet and nmr spectra as

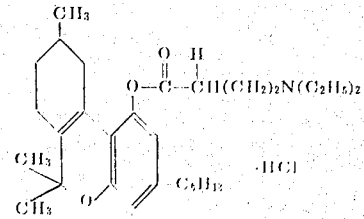

Anal. Calcd for $C_{30}H_{47}NO_3 \cdot HCl$: C, 71.19; H, 9.56; N, 2.77; Cl, 7.00. Found: C, 71.14; H, 9.69; N, 2.80; Cl, 6.90.

EXAMPLE 8 b  1-[4-(Diethylamino)butyryloxy]-3-hexyl-7,8,9,10-tetrahydro-6,6,9-trimethyl-6H-dibenzo[b,d]pyran This is prepared by the method of Example 7, except that 4-diethylaminobutyric acid is substituted for the 4-diethylaminobutyric acid hydrochloride to give the free amino ester of the formula

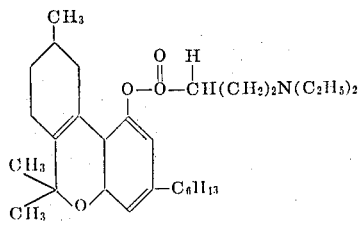

This free amino ester may be converted to the corresponding hydrochloride salt of Example 7 by treatment with ethanolic hydrogen chloride to give a product indentical with that of Example 7.

EXAMPLE 9

1-[4-(Diethylamino)butyryloxy]-3-pentyl-7,8,9,10-tetrahydro-6,6,9-trimethyl-6H-dibenzo[b,d]pyran Hydrochloride A solution of 1.68 grams (5.35 mmoles) of 1-hydroxy-3-pentyl-7,8,9,10-tetrahydro-6,6,9-trimethyl-6H-dibenzo[b,d]pyran (prepared according to R. Adams and B. R. Baker, J. Am. Chem. Soc., 62, 2405 (1940)), 1.14 grams (5.54mmoles) of dicyclohexylcarbodiimide and 1.06 grams (5.43 mmoles) of 4-diethylaminobutyric acid hydrochloride in 50 ml of methylene chloride was stirred for 18 hr at room temperature. The work-up was ths same as described in Examples 1 and 3 to yield 1.4 grams (48 percent) of colorless crystals, m.p. 79°–83. A sample recrystallized from a mixture of ether and benzene had m.p. 86°–90° dec. Infrared, ultraviolet and nmr spectra confirmed the structure to be

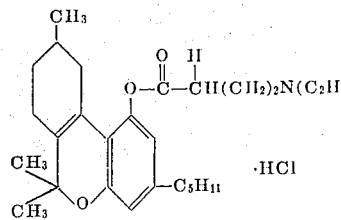

Anal. Calcd for $C_{29}H_{45}NO_3 \cdot HCl$: C, 70.77; H, 9.42; N, 2.84; Cl, 7.20. Calcd for $C_{29}H_{45}NO_3 \cdot HCl \cdot H_2O$: C, 68.28; H, 9.48; N, 2.74; Cl, 6.95. Found: C, 68.42; H, 9.70; N, 2.74; Cl, 7.10.

EXAMPLE 10

1-[4-(Diethylamino)butyryloxy]-3-pentyl-7,8,9,10-tetrahydro-6,6,7-trimethyl-6H-dibenzo[b,d]pyran This is prepared by the method of Example 9, except that 4-diethylaminobutyric acid is substituted for the 4-diethylaminobutyric acid hydrochloride to give the free amino ester of the formula

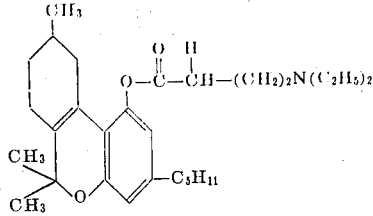

This free amino ester may be converted to the corresponding hydrochloride salt of Example 9 by treatment with ethanolic hydrogen chloride to given a product identical with that of Example 9.

It will thus be seen that the objects set forth above, among those made apparent from the preceding description, are efficiently attained, and, since certain changes may be made in carrying out the above method and in the composition set forth without departing from the scope of the invention, it is intended that all matter contained in the above description shall be interpreted as illustrative and not in a limiting sense.

We claim:

1. A compound having the formula

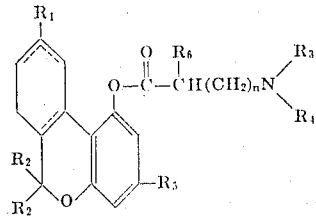

wherein $n$ is a whole number ranging from 0 to 6, $R_1$, $R_2$, $R_3$ and $R_4$ are lower-alkyl of from 1 to 6 carbon atoms, $R_5$ is alkyl of from 1 to 20 carbon atoms or cycloalkyl-lower-alkyl wherein the cycloalkyl moiety contains from 3 to 8 carbons atoms and $R_6$ is hydrogen or lower-alkyl of from 1 to 6 carbon atoms.

2. A compound in accordance with claim 1 having the formula

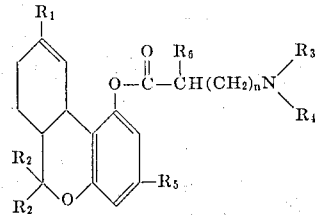

wherein $n$ is a whole number ranging from 0 to 6, $R_1$, $R_2$, $R_3$ and $R_4$ are lower-alkyl of from 1 to 6 carbon atoms, $R_5$ is alkyl of from 1 to 20 carbon atoms or cycloalkyl-lower-alkyl wherein the cycloalkyl moiety contains from 3 to 8 carbon atoms and $R_6$ is hydrogen or lower-alkyl of from 1 to 6 carbon atoms.

3. A compound in accordance with claim 2 wherein $n$ is 2, $R_1$ and $R_2$ are methyl, $R_3$ and $R_4$ are ethyl, $R_5$ is pentyl, $R_6$ is hydrogen and said compound is 1-[4-(diethylamino)butyryloxy]3-pentyl-6a,7,8,10a-tetrahydro-6,6,9-trimethyl-6H-dibenzo[b,d]pyran.

4. A compound in accordance with claim 2 wherein n is 2, $R_1$ and $R_2$ are methyl, $R_3$ and $R_4$ are ethyl, $R_5$ is 3-methyl-2-octyl, $R_6$ is hydrogen and said compound is 1-[4-(diethylamino) butyryloxy]-3-[3-methyl-2-octyl]-6a,7,8,10a-tetrahydro-6,6,9-trimethyl-6H-dibenzo[b,d]pyran.

5. A compound in accordance with claim 1 having the formula

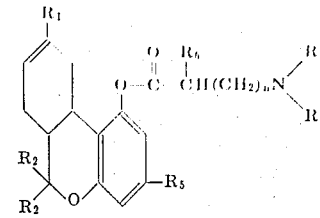

wherein n is a whole number ranging from 0 to 6, $R_1$, $R_2$, $R_3$ and $R_4$ are lower-alkyl of from 1 to 6 carbon atoms, $R_5$ is alkyl of from 1 to 20 carbon atoms or cycloalkyl-lower-alkyl wherein the cycloalkyl moiety contains from 3 to 8 carbon atoms and $R_6$ is hydrogen or lower-alkyl of from one to six carbon atoms.

6. A compound in accordance with claim 5 wherein n is 2, $R_1$ and $R_2$ are methyl, $R_3$ and $R_4$ are ethyl, $R_5$ is pentyl, $R_6$ is hydrogen and said compound is 1-[4-(diethylamino)- butyryloxy]-3-pentyl-6a,7,10,10a-tetrahydro-6,6,9-trimethyl-6H-dibenzo[b,d]pyran.

7. A compound in accordance with claim 1 having the formula

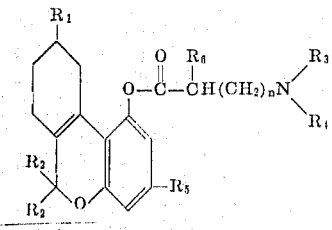

wherein n is a whole number ranging from 0 to 6, $R_1$, $R_2$, $R_3$ and $R_4$ are lower alkyl of from 1 to 6 carbon atoms, $R_5$ is alkyl of from 1 to 20 carbon atoms or cycloalkyl-lower-alkyl wherein the cycloalkyl moiety contains from 3 to 8 carbon atoms and $R_6$ is hydrogen or lower-alkyl of from 1 to 6 carbon atoms.

8. A compound in accordance with claim 7 wherein n is 2, $R_1$ and $R_2$ are methyl, $R_3$ and $R_4$ are ethyl, $R_5$ is hexyl, $R_6$ is hydrogen and said compound is 1-[4-diethylamino)butyryloxy]3-hexyl-7,8,9,10-tetrahydro-6,6,9-trimethyl-6H-dibenzo[b,d]pyran.

9. A compound in accordance with claim 7 wherein n is 2, $R_1$ and $R_2$ are methyl, $R_3$ and $R_4$ are ethyl, $R_5$ is pentyl, $R_6$ is hydrogen and said compound is 1-[4-diethylamino)butyryloxy]3-pentyl-7,8,9,10-tetrahydro-6,6,9-trimethyl-6H-dibenzo[b,d]pyran.

10. A compound having the formula

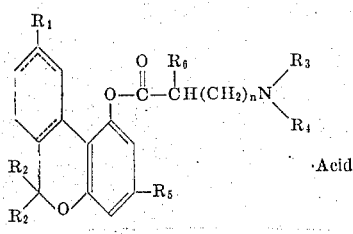

wherein n is a whole number ranging from 0 to 6, $R_1$, $R_2$, $R_3$ and $R_4$ are lower-alkyl of from 1 to 6 carbon atoms, $R_5$ is alkyl of from 1 to 20 carbon atoms or cycloalkyl-lower-alkyl wherein the cycloalkyl moiety contains from 3 to 8 carbons atoms, $R_6$ is hydrogen or lower-alkyl of from 1 to 6 carbon atoms and Acid is an organic or inorganic acid capable of forming an acid-addition salt.

11. A compound in accordance with claim 11 having the formula

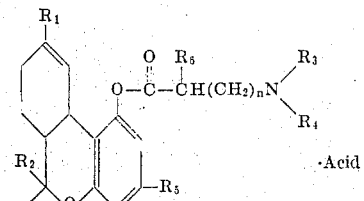

wherein n is a whole number ranging from 0 to 6, $R_1$, $R_2$, $R_3$ and $R_4$ are lower-alkyl of from 1 to 6 carbon atoms, $R_5$ is alkyl of from 1 to 20 carbon atoms or cycloalkyl-lower alkyl wherein the cycloalkyl moiety contains from 3 to 8 carbon atoms, $R_6$ is hydrogen or lower-alkyl of from 1 to 6 carbon atoms and Acid is an organic or inorganic acid capable of forming an acid-addition salt.

12. A compound in accordance with claim 11 wherein n is 2, $R_1$ and $R_2$ are methyl, $R_3$ and $R_4$ are ethyl, $R_5$ is pentyl, $R_6$ is hydrogen and Acid is HCl and said compound is the hydrochloric acid addition salt of 1-[4-(diethylamino)butyryloxy]-3-pentyl-6a, 7,8,10a-tetrahydro-6,6,9-trimethyl-6H-dibenzo[b,d]pyran.

13. A compound in accordance with claim 11 wherein n is 2, $R_1$ and $R_2$ are methyl, $R_3$ and $R_4$ are ethyl, $R_5$ is 3-methyl-2-octyl, $R_6$ is hydrogen and Acid is HCl and said compound is the hydrochloric acid addition salt of 1-[4-(diethylamino)butyryloxy]-3-[3-methyl-2-octyl]-6a, 7,8,10a-tetrahydro-6,6,9-trimethyl-6H-dibenzo[b,d]pyran.

14. A compound in accordance with claim 10 having the formula

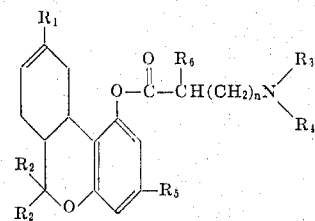

wherein n is a whole number ranging from zero to six, $R_1$, $R_2$, $R_3$ and $R_4$ are lower-alkyl of from 1 to 6 carbon atoms, $R_5$ is alkyl of from 1 to 20 carbon atoms or cycloalkyl-lower-alkyl wherein the cycloalkyl moiety contains from 3 to 8 carbon atoms, $R_6$ is hydrogen or lower-alkyl of from 1 to 6 carbon atoms and Acid is an organic or inorganic acid capable of forming an acid-addition salt.

15. A compound in accordance with claim 15 wherein n is 2, $R_1$ and $R_2$ are methyl, $R_3$ and $R_4$ are ethyl, $R_5$ is pentyl, $R_6$ is hydrogen and Acid is HCl and said compound is the hydrochloric acid addition salt of 1-[4-(diethylamino)butyryloxy]-3-pentyl-6a, 7,10,10a-tetrahydro-6,6,9-trimethyl-6H-dibenzo[b,d]pyran.

16. A compound in accordance with claim 10 have the formula

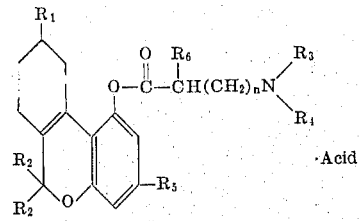

wherein n is a whole number ranging from zero to sic, $R_1$, $R_2$, $R_3$ and $R_4$ are lower-alkyl of from 1 to 6 carbon atoms, $R_5$ is alkyl of from 1 to 20 carbon atoms or cycloalkyl-lower-alkyl wherein the cycloalkyl moiety contains from 3 to 8 carbon atoms, $R_6$ is hydrogen or lower-alkyl of from 1 to 6 carbon atoms and Acid is an organic or inorganic acid capable of forming an acid-addition salt.

17. A compound in accordance with claim 16 wherein n is 2, $R_1$ and $R_2$ are methyl, $R_3$ and $R_4$ are ethyl, $R_5$ is hexyl, $R_6$ is hydrogen and Acid is HCl and said compound is the hydrochloric acid addition salt of 1-[4-diethylamino)butyryloxy]-3-hexyl-7,8,9,10-tetrahydro-6,6,9-trimethyl-6H-dibenzo[b,d]pyran.

18. A compound in accordance with claim 16 wherein $n$ is 2, $R_1$ and $R_2$ are methyl, $R_3$ and $R_4$ are ethyl, $R_5$ is pentyl, $R_6$ is hydrogen and Acid is HCl and said compound is the hydrochloric acid addition salt of 1-[4-diethylamino)butyryloxy]-3-pentyl-7,8,9,10-tetrahydro-6,6,9-trimethyl-6H-dibenzo[b,d]pyran.

* * * * *

UNITED STATES PATENT OFFICE
CERTIFICATE OF CORRECTION

Patent No. 3,728,360  Dated April 17, 1973

Inventor(s) Harry G. Pars, Raj K. Razdan and Klaus K. Weinhardt

It is certified that error appears in the above-identified patent and that said Letters Patent are hereby corrected as shown below:

Col. 13, line 57, change "11" to read "10".

Claim 14, in the formula add "Acid"

Column 14, line 42, change "15" to read "14".

Signed and sealed this 27th day of November 1973.

(SEAL)
Attest:

EDWARD M. FLETCHER, JR.  
Attesting Officer

RENE D. TEGTMEYER  
Acting Commissioner of Patents